US008395782B2

(12) United States Patent
Patel et al.

(10) Patent No.: US 8,395,782 B2
(45) Date of Patent: Mar. 12, 2013

(54) DETECTION AND LOCATION OF BOUNDARY INTRUSION, USING COMPOSITE VARIABLES DERIVED FROM PHASE MEASUREMENTS

(75) Inventors: Jayantilal S. Patel, Newtown, PA (US); Zhizhong Zhuang, Bensalem, PA (US); Yuri Zadorozhny, Morrisville, PA (US); Francesco A. Annetta, Princeton, NJ (US)

(73) Assignee: Optellios, Inc., Newton, PA (US)

( * ) Notice: Subject to any disclaimer, the term of this patent is extended or adjusted under 35 U.S.C. 154(b) by 688 days.

(21) Appl. No.: 12/438,877

(22) PCT Filed: Aug. 29, 2007

(86) PCT No.: PCT/US2007/077101

§ 371 (c)(1), (2), (4) Date: Feb. 25, 2009

(87) PCT Pub. No.: WO2008/027959

PCT Pub. Date: Mar. 6, 2008

(65) Prior Publication Data

US 2010/0014095 A1 Jan. 21, 2010

Related U.S. Application Data

(63) Continuation-in-part of application No. 11/570,481, filed as application No. PCT/US2005/011045 on Apr. 1, 2005, now Pat. No. 7,725,026, which is a continuation-in-part of application No. 10/911,326, filed on Aug. 4, 2004, now Pat. No. 7,139,476.

(60) Provisional application No. 60/841,511, filed on Aug. 31, 2006, provisional application No. 60/841,595, filed on Aug. 31, 2006, provisional application No. 60/845,084, filed on Sep. 13, 2006.

(51) Int. Cl.
*G01B 9/02* (2006.01)

(52) U.S. Cl. ........................................ 356/483

(58) Field of Classification Search .................. 356/477, 356/483, 478; 385/12, 13
See application file for complete search history.

(56) References Cited

U.S. PATENT DOCUMENTS 4,773,759 A * 9/1988 Bergh et al. .................. 356/460
4,874,244 A * 10/1989 Kersey .......................... 356/460
(Continued)

FOREIGN PATENT DOCUMENTS

| | | |
|---|---|---|
| GB | 1497995 | 1/1978 |
| GB | 02204204 | 11/1998 |
| JP | 10160635 | 6/1998 |

OTHER PUBLICATIONS

Stephaus J. Spammer, Pieter L Swart,"Merged Sagnac-Michelson Interferometer for Distributed Disturbance Detection", Journal of Lightwave Technology, vol. 15, No. 6, Jun. 1997.

(Continued)

*Primary Examiner* — Tarifur Chowdhury
*Assistant Examiner* — Jonathan Hansen
(74) *Attorney, Agent, or Firm* — Duane Morris LLP

(57) ABSTRACT

A disturbance, such as vibration from human activity, is located along a fiberoptic waveguide configuration (301-304) with two interferometers (801, 802) of the same or different types, such as Mach-Zehnder, Sagnac, and Michelson interferometers. Carrier signals from a source (101) are split at the interferometer inputs (201, 202) and re-combined at the outputs (701, 702) after propagating through the detection zone (401), where phase variations are induced by the disturbance (501). Phase responsive receivers (901, 902) detect phase relationships (1001, 1002) between the carrier signals over time. A processor (1101) combines the phase relationships into composite signals according to equations that differ for different interferometer configurations, with a time lag between or a ratio of the composite signals representing the location of the disturbance. The detected and composite values are unbounded, permitting phase displacement to exceed the carrier period and allowing disturbances of variable magnitudes to be located.

5 Claims, 7 Drawing Sheets

U.S. PATENT DOCUMENTS

| | | | | | |
|---|---|---|---|---|---|
| 4,885,462 | A | | 12/1989 | Dakin | |
| 5,206,923 | A | | 4/1993 | Karlsson | |
| 5,355,208 | A | * | 10/1994 | Crawford et al. | 356/35.5 |
| 5,402,231 | A | * | 3/1995 | Udd | 356/460 |
| 5,694,114 | A | | 12/1997 | Udd | |
| 5,886,802 | A | | 3/1999 | Majima | |
| 6,049,506 | A | * | 4/2000 | White | 356/451 |
| 6,194,707 | B1 | | 2/2001 | Yang | |
| 6,211,957 | B1 | | 4/2001 | Erdogan | |
| 6,621,947 | B1 | | 9/2003 | Tapanes | |
| 6,667,935 | B2 | | 12/2003 | Vakoc | |
| 6,721,502 | B1 | | 4/2004 | Al-Salameh | |
| 6,778,717 | B2 | | 8/2004 | Tapanes et al. | |
| 6,897,424 | B2 | | 5/2005 | Suzuki | |
| 6,900,897 | B2 | | 5/2005 | Froggatt | |
| 7,725,026 | B2 | * | 5/2010 | Patel et al. | 398/16 |
| 2004/0047628 | A1 | | 3/2004 | Passier | |
| 2004/0060697 | A1 | * | 4/2004 | Tilton et al. | 166/253.1 |
| 2004/0061863 | A1 | * | 4/2004 | Digonnet | 356/460 |
| 2008/0180681 | A1 | * | 7/2008 | Digonnet | 356/477 |

OTHER PUBLICATIONS

Bogdan Kizlik, "Fiber Optic Distributed Sensor in Mach-Zehnder Interferometer Configuration," TCSET'2002 Lviv-Slavsko, Ukraine.

* cited by examiner

DETECTION AND LOCATION OF BOUNDARY INTRUSION, USING COMPOSITE VARIABLES DERIVED FROM PHASE MEASUREMENTS

CROSS-REFERENCE TO RELATED APPLICATIONS

This is a continuation-in-part of application Ser. No. 11/570,481, filed Dec. 12, 2006 now U.S. Pat. No. 7,725,026 filed Apr. 1, 2005 as international application PCT/US2005/011045, which is a continuation-in-part of application Ser. No. 10/911,326, filed Aug. 4, 2004, now U.S. Pat. No. 7,139,476. This application claims the priority of provisional applications Ser. No. 60/841,511, filed Aug. 31, 2006; Ser. No. 60/841,595, filed Aug. 31, 2006; and, Ser. No. 60/845,084, filed Sep. 13, 2006.

BACKGROUND OF THE INVENTION

1. Field of the Invention

The invention relates to sensing the effects of a physical disturbance along a signal path, especially human activity at a fence, buried sensing line or other extended sensing path.

A disturbance produces vibration, impact, acoustic noises, stress and/or pressure variations and the like, locally changing one or more signal paths in a manner that produces a time change in the phase relationships between carrier signals propagating along the signal paths, e.g., one or more optical fibers. These phase effects originate at the point of the disturbance and are carried onward as the carrier signals propagate. Advantageous detection of these phase effects in the present invention allows the location of the disturbance to be discerned.

According to the invention, at least two interferometers are configured and comprise, in part, the one or more signal paths affected by the disturbance. The interferometers produce at least two phase variables in which the phase effects of the disturbance are manifested. The at least two interferometers can comprise the same and/or different interferometer configurations, including, but not limited to Mach-Zehnder, Sagnac, and/or Michelson interferometer configurations. In certain embodiments, the produced phase variables are not directly useful, but they are combined by relationships disclosed herein to produce new composite variables. The relationship between the composite variables enables the location of the disturbance to be discerned. In certain embodiments, this relationship is the time lag between the variations over time of two composite variables that have identical waveshapes over time. The time lag identifies the location of the disturbance in view of the specific layout of the interferometers used. In other embodiments, the ratio of the composite variables identifies the location.

2. Description of the Related Art

Intrusion detection advantageously involves detection of the location of a disturbance that impinges on a boundary such as the perimeter of a protected area, e.g., a person climbing a fence into or out of a secured premises. Aside from sensing a breach of security, it may be desirable to detect activity near a given sensing boundary, or crossing a boundary, or proceeding along a path or other sensing line. Such activities are generally exemplified herein with reference to intrusion detection. Detecting the location of the disturbance refers to determining a point along an elongated line or boundary near or at which activity occurs. The line or boundary is elongated but it might or might not be a straight line. Activity causes a localized physical disturbance, such as vibration, sound waves, stress from the weight of persons or vehicles, etc. It is desirable to detect disturbances quickly and accurately and to identify where exactly the disturbance occurred. With knowledge of the geometry of the elongated sensing path, and the linear point along the path where a disturbance occurs, the location of the disturbance is determined.

U.S. Pat. No. 7,139,476 and parent patent application Ser. No. 11/570,481, filed Dec. 12, 2006 (the US national phase of PCT/US05/11045) concern using the timing parameters of signals affected by a physical disturbance, to calculate the location of a disturbance. The disclosures of said patent and application are hereby incorporated in their entireties. Generally in a device of this description (compare FIG. 1), one or more signals are inserted via couplers or junctions that split and/or combine the signals to produce signal components that are carried in fiber optic waveguides placed to define a detection zone. The fiber optic waveguides might be kilometers long and might be placed along any path, e.g., a straight line or a closed path around an area, or defining a complex array like a raster, or perhaps a three dimensional route through a volume or traversing successive tiers or layers. In the example shown in FIG. 1, solid and dashed lines distinguish the signals that are inserted at either end of a bidirectional path and propagate in opposite directions. An object is to discern the location of a disturbance from the effects of the disturbance on the signal components.

The physical disturbance occurs in the detection zone at some distance $L_1$ from the input end of the first interferometer and a distance $L_2$ from that of the second interferometer. The total distance $L_1+L_2$ is a constant, namely the total length. The physical disturbance (e.g., a vibration, a noise, an impact or other physical stress on the fiber optic cable) has a localized physical effect on the fiber optic waveguide. The disturbance modulates the phase of the signal(s) carried in the waveguides. The modulation that is important is a substantially localized time-varying phase shift, typically at a frequency in the range of audible acoustic signals or perhaps including low frequency or higher frequency inaudible signals. The amplitude of the phase modulation typically exceeds the period of the carrier optical signal.

The signals propagating in the same direction have a given phase relationship and the effect of the disturbance is to vary the phase relationship over time, i.e., to produce a shift in the phase relationship between two respective signals. For each pair of signals in FIG. 1, the induced phase variations are designated as $\phi_1(t)$ for one signal path, and $\phi_2(t)$ for the other. The relative phase difference or displacement between the two signal paths in the first interferometer (propagating from left to right), detected at time t, will be $\Phi_1(t)=\phi(t-t_2)+\phi_{01}$; while the one for the second interferometer (with signal propagating from right to left) will be $\Phi_2(t)=\phi(t-t_1)+\phi_{02}$. Here $\phi(t)\equiv\phi_2(t)-\phi_1(t)$, $t_1=L_1/c$, $t_2=L_2/c$, and c is the speed of carrier signal propagation. Furthermore, $\phi_{01}$ and $\phi_{02}$ are defined as the respective contributions of the remainder of the structure to the total phase difference in each interferometer. These contributions $\phi_{01}$ and $\phi_{02}$ typically vary slowly compared to the time scale of variations from a typical physical disturbance (e.g., physical stress due to movement of a person or vehicle), and generally may be regarded as substantially constant.

In previous patent U.S. Pat. No. 7,139,476 and parent application Ser. No. 11/570,481, the measured phase differences $\Phi_1(t)$ and $\Phi_2(t)$ are substantially identical waveforms (because they were induced by the same local disturbance on counter-propagating signals in the same signal paths) except for the substantially constant offset $\phi_{01}$-$\phi_{02}$ and a time lag $t_2-t_1$ due to the difference in propagation distances from the disturbance, between the two signal directions. The time lag is uniquely determined by the position of the disturbance (and may be zero if $L_1=L_2$). By extracting the time lag, for example, by finding a peak cross-correlation between the waveforms $\Phi_1(t)$ and $\Phi_2(t)$ at some value of time lag, the position of the disturbance can be measured. This approach will work, provided that the phase responses from the different interferometers have the same waveform shape but are time-shifted.

In FIG. 1, each opposite direction forms an interferometer. The two oppositely oriented signal interferometers in FIG. 1 are each structured as Mach-Zehnder interferometers. In this dual Mach-Zehnder configuration, in each counter propagating direction, a source signal is split by a coupler at one end into components that propagate along two signal legs and interfere with one another at a coupler at the opposite end. The interference signals from the two opposite interferometers do not generally produce intensity waveforms that have the same shape over time.

The Mach-Zehnder interferometer structure shown in FIG. 1, and also other interferometer structures, are known in the art and have been proposed as sensing means, including in fiber-optic-based embodiments, and including in the context of intrusion detection and location. Detectors have been proposed wherein the interferometers are of the same type and also wherein different interferometer types are used. Furthermore, applications of certain coextensive paired or oppositely-oriented overlaid interferometer structures have been proposed for intrusion detection and location, for example, as in Udd, U.S. Pat. No. 5,694,114.

These disclosures in the prior art use the intensities of interference signals as the variables that are measured. However, the time varying shapes of intensities of interference signals in paired interferometer structures are generally different. The intensity signals generally lack a time lag aspect that is uniquely related to the location of the disturbance. The shapes of the intensities can be made substantially the same, if certain conditions are maintained or techniques are invoked, as described in commonly-owned previous U.S. Pat. No. 7,139,476, or the time lag variable can be resolved using phase response signals instead, as described above and disclosed in detail in U.S. Pat. No. 7,139,476 and U.S. patent application Ser. No. 11/570,481.

A technique for inferring the location of a disturbance based on the intensity of interference signals is disclosed in Udd, U.S. Pat. No. 5,694,114, including employing oppositely oriented and overlaid Sagnac interferometers. However, intensity-based techniques such as that of Udd are limited in effectiveness and practicality. For example, in Udd, it is recognized that the technique can only respond to small disturbances. If a disturbance produces phase modulation that is large in amplitude compared to the period of the carrier signal, the proposed intensity-based techniques fail. In practical situations, there is no routine way to limit the magnitude of the disturbance. In fact, in fiber-optic interferometers (such as those described in U.S. Pat. No. 7,139,476 and Ser. No. 11/570,481), the present inventors have discovered that the extent of phase modulation in the detected signals can easily exceed the applicability limit of Udd's small disturbance technique.

Another example was discussed by Stephaus J. Spammer ("Merged Sagnac-Michelson Interferometer for Distributed Disturbance Detection", Stephaus J. Spammer, Pieter L. Swart, Journal of Lightwave Technology, Vol. 15, No. 6, June 1997), wherein an approach similar to Udd uses the combination of a Sagnac interferometer and a Michelson interferometer. As described above with respect to Udd, Spammer's approach depends on intensity response and is subject to similar limitations.

SUMMARY OF THE INVENTION

It is an object of the present invention that the position of a localized disturbance is determined based on signal phase measurements made from a combination of plural sensors, each capable of producing a phase response when disturbed. It is also an object of the present invention to further obtain composite signal from the phase responses of various structures, such that the location of the disturbance can be derived from a relationship between the composite signals.

In one embodiment, the phase responses that are produced are measured and processed to obtain plural composite signals of a substantially identical shape over time, differing by a time shift that is uniquely determined by the position of the disturbance with respect to ends of a structure in which the carrier signals are propagated. Measuring the time lag between these processed composite signals allows for the position of the disturbance to be determined according to the nature of one or more types of interferometers used to produce the composite signals.

In an alternative embodiment, the phase responses are processed to produce composite signals, including at least one composite signal, the magnitude of which depends on a position of the disturbance. This signal is transformed to remove other dependences, and a signal parameter is derived from which the location of the disturbance can be determined.

Techniques based on the present invention are described in non-limiting examples including different combinations of plural interferometers of basic types and techniques showing how composite signals representing the location of the disturbance are derived, thus demonstrating the technique's applicability to these examples as well as its universal application to interferometer systems having certain minimum elements as described in detail below.

DETAILED DESCRIPTION OF THE INVENTION

Figure 1:
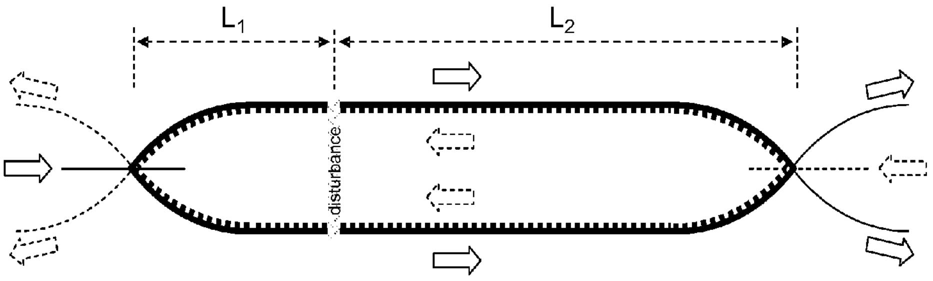
FIG. 1 is a diagram showing a dual Mach-Zehnder interferometer structure as a non-limiting example of a plural interferometer location sensing structure.
Figure 2:
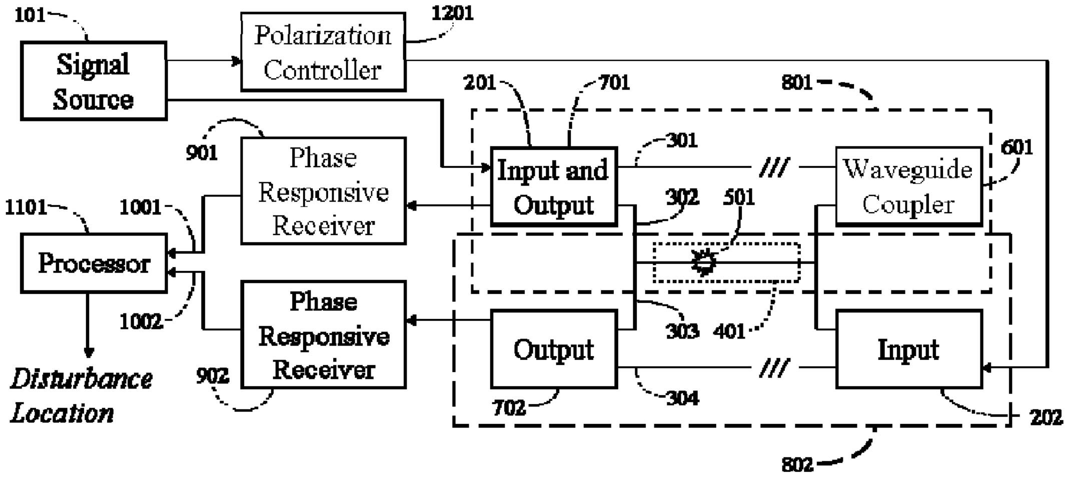
FIG. 2 is a block diagram of an exemplary hybrid interferometer structure with its two interferometers sharing portions of waveguides traversing a detection zone, and including blocks showing the signal source, interferometer ends, and phase receivers for each interferometer, coupled to a processor.

According to respective embodiments of the invention disclosed herein, a disturbance such as vibration is detected and located along a fiber optic waveguide. Multiple optical fibers or optical fibers carrying multiple signals are configured as two or more interferometers. The interferometers can be of the same or different interferometer types, according to respective embodiments. Signals split from a source are recombined after the signals propagate through the point of the disturbance, where phase variations are induced. Phase responsive receivers at the combiners each produce mutually independent detector signals representing phase relationships between the combined signals. Variations over time in the phase relationships are processed to produce composite signals. The equations embodied by processing differ based on the specific interferometer configuration used. For each interferometer configuration, one embodiment produces composite signals with substantially identical waveshapes that correlate at a time lag indicating the disturbance location. In another embodiment, a proportion of the composite signals correspond to the disturbance location. In each case the technique produces phase responses and composite signals that are unbounded, meaning that the phase signal variation or displacement can exceed a carrier period and the cross-correlation or proportionate relation to the location of the disturbance holds true.

According to the inventive methods and apparatus for determining a location of a physical disturbance, at least one signal source provides carrier signals. Two interferometers, each interferometer comprising two waveguides and defining two signal paths are coupled at respective input ends, e.g., through a signal splitter, to the signal source. An output end of each interferometer comprises at least one signal combiner configured to combine signals traveling along the signal paths for a respective said interferometer.

At least part of at least one of the signal paths from one of the two interferometers overlaps at least part of at least one of the signal paths from the other of the two interferometers. The signals traveling along the parts of the signal paths that overlap define a detection zone and traverse the detection zone at least once. The disturbance instills a time change in a phase relationship between the signals traveling along the signal paths, at a point where the disturbance occurs, for both of the interferometers. This effect propagates along at the propagation speed of the carrier signals.

At least one phase responsive receiver is coupled to the output ends of each respective said interferometer. The phase responsive receiver has at least one detection device coupled to the signal combiner. The detection devices generate two mutually independent detector signals. Each pair of independent detector signals represents a phase relationship of the signals that travel along the signal paths of the respective interferometer.

A processor is coupled to derive composite signals from the phase relationships. A relationship between the composite signals for each of said two interferometers varies with a location of the point of disturbance, such that a value of the relationship corresponds to said point in the detection zone at which the disturbance occurred. In different embodiments the specific relationship varies and the operations embodied by the equations producing the composite signal likewise are different. Nevertheless, the invention produces a measure of the location of the disturbance according to one or more techniques based on measurements of phase relationships wherein the amplitude of phase displacement is not bounded by the period of the carrier.

The structure in FIG. 1, comprising two Mach-Zehnder-type interferometers, is described, for example, in previous patent application Ser. No. 11/570,481, filed Dec. 12, 2006, the entire disclosure of which has been incorporated herein together with that of U.S. Pat. No. 7,139,476. Each interferometer comprises two waveguides defining two signal paths. A disturbance along signal path generates substantially identical but time-shifted phase changes for each of the two interferometers, with which the disturbance can be detected and located. The sensitive signal paths thus define a detection zone, in which the disturbance can be detected and located.

Various sensing structures comprising two interferometers may not produce such substantially identical phase responses. However, the need for time-shifted identical phase responses can be supplanted by introducing a concept of composite signals. The composite signals are signals derived from the measured phase responses, from which the location of a disturbance can be obtained. The conversion from measured phase responses to the composite signals is structure-specific. In the following description, several non-limiting embodiments are discussed to teach this concept and to demonstrate the location resolving techniques.

In addition to the Mach-Zehnder interferometer structural configuration, there are two more basic interferometer structures, known as the Sagnac interferometer and the Michelson interferometer. More complex structures are generally reducible to one, or a combination, of these basic types. The following non-exhaustive list of structures involving different combinations of these basic interferometers is provided to illustrate the operation of the present invention by way of non-limiting examples.

Figure 3:
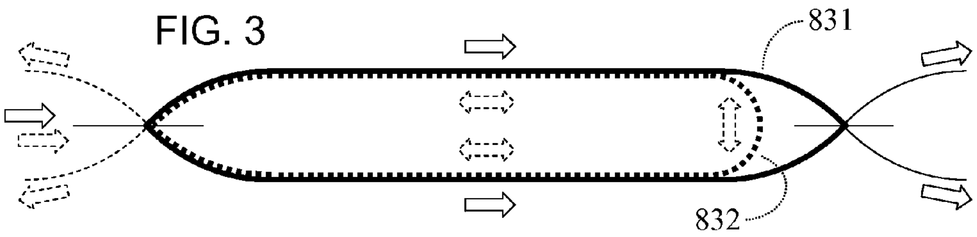
FIG. 3 is a diagram showing an exemplary hybrid interferometer structure comprising plural distinct interferometers, in this example, a Mach-Zehnder interferometer and a Sagnac interferometer.

In one non-limiting example, one of the interferometers (e.g., 831 in FIG. 3) may be configured to function as a Mach-Zehnder interferometer with its two signal paths represented by two waveguides forming interferometer arms. Another interferometer (832) may be configured as a Sagnac interferometer, wherein two waveguides in this case are coupled together at the far end of the structure, or otherwise are formed into a Sagnac loop, in which the two signal paths are the clockwise and the counterclockwise signal propagation directions.

The two interferometers may share parts of the signal paths, including parts traversing the detection zone. Each interferometer further comprises a phase-responsive receiver that can be used to obtain the phase response for the respective interferometer. Without limiting the generality, the phase responsive receiver for each of the interferometers may be in a form comprising a 3×3 coupler. Furthermore, the signal splitter for one of the interferometers may also function as the signal splitter as well as combiner for the other interferometer. This configuration is illustrated schematically in FIG. 3. Other non-limiting examples of signal combiners used to implement phase-responsive receivers in the context of intrusion detection and location have been disclosed in U.S. Pat. No. 7,139,476 and PCT/US05/11045.

The phase responses of the two interferometers for this structure are $$\Phi_1(t)=\phi(t-t_2)$$

$$\Phi_2(t)=\phi(t-t_1)-\phi(t-t_2-t_0)$$

Here $\phi(t)$ is the disturbance-induced relative phase accumulated by the two signals in the two arms of the Mach-Zehnder interferometer, passing through the point of disturbance at time t. The disturbance may affect one of the two shared waveguides forming the two interferometers, or it may affect both of them, generally to a different extent. When both waveguides traverse the detection zone, they are arranged co-extensively, so that each point of the detection zone is at substantially the same distance from the ends of the structure whether measured along one or the other waveguide. The signal propagation time from the input ends of the two interferometers to the point of disturbance is $t_1$. The signal propagation time from the point of disturbance to the output end of the interferometer (831) as well as the mid-point of the Sagnac loop of interferometer (832) is $t_2$. And, $t_0=t_1+t_2$ is the one-way signal trip time. The substantially constant background phase offsets are not essential for the present discussion and are therefore omitted for the sake of brevity from here on. In other words, interferometer phase response $\Phi(t)$ is defined up to a constant. The same definitions are used throughout the remainder of the disclosure, adjusted for the structures involved in context.

The measured phase responses $\Phi_1(t)$ and $\Phi_2(t)$ generally are different and do not have the same shape, nor can one define a time lag between them. However, the interferometer phase responses can be purposefully combined to produce composite response signals $\Phi'_1(t)$ and $\Phi'_2(t)$. There is generally more than one way to design composite signals having the desired properties of identical waveshapes with a time lag, for the same structure. Only one is provided here as an example:

$$\Phi'_1(t)\equiv\Phi_1(t)=\phi(t-t_2)$$

$$\Phi'_2(t)\equiv\Phi_1(t-t_0)+\Phi_2(t)=\phi(t-t_1)$$

The composite signals are, indeed, identical, except for the time lag of $t_2-t_1$, the measurement of which time lag allows the location of the disturbance to be determined.

The second composite signal is obtained in part from the phase response of interferometer (831), $\Phi_1(t)$, retarded by to, which is known and determined by the total length of the sensor $L_0=t_0c$. The retarded signal may therefore be simply obtained from the history of the detected phase response $\Phi_1(t)$. Alternatively, the same retardation effect can be achieved by returning the signals derived by the beam combiner of interferometer (841) back to the originating point of interferometer (84 1), thus adding a trip time of $t_0$, before the signals are detected. This is shown schematically in FIG. 4. The same retarded signal $\Phi_1(t-t_0)$ can be used for $\Phi'_1(t)$. The time lag between $\Phi'_1(t)$ and $\Phi'_2(t)$ will then be $2t_2$. Such a composite signal approach applies to structures having lead-in and lead-out signal waveguides of non-negligible length, as well as structures where the two interferometers have substantially different lengths (or one-way signal propagation times), although the details of the composite signal construction may vary.

In certain configurations, for example in those pairing interferometers of the same type, the phase responses of the two interferometers are either substantially identical in shape, or not substantially identical in the context of the previous discussion, but nonetheless are similar in shape. This property makes it possible to reconstruct the phase response of one of the interferometers based on a single optical intensity signal together with the measured phase response of the second interferometer.

Another situation in which a single intensity signal is sufficient to derive the phase response is when the phase response does not exceed π radians. In practical situation, however, phase response may easily exceed this limit. For some structures and disturbances, the phase response exceeds π radians by orders of magnitude. When it does, phase detection becomes essential. The composite signal technique disclosed herein applies to phase variables and generally is not applicable to intensity signals.

Figure 5:
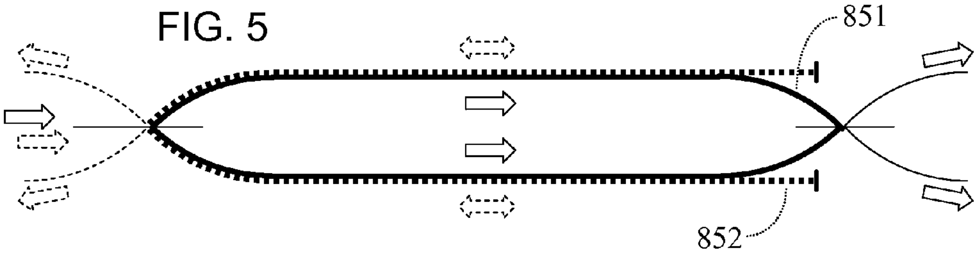
FIG. 5 is a diagram showing an exemplary hybrid interferometer structure comprising a Mach-Zehnder interferometer and a Michelson interferometer.

In the next example, interferometer (851) is configured as a Mach-Zehnder and (852) as a Michelson interferometer (FIG. 5). Rather than looping back the signals as in Sagnac-type structure, in the Michelson interferometer (852), mirrors are used to couple the signals back to retrace their own physical path in the same waveguides. The phase responses of the two interferometers for this structure are $$\Phi_1(t)=\phi(t-t_2)$$

$$\Phi_2(t)=\phi(t-t_1)+\phi(t-t_2-t_0)$$

The composite signals, which in this case are defined as $$\Phi'_1(t)\equiv\Phi_1(t)=\phi(t-t_2)$$

$$\Phi'_2(t)\equiv\Phi_1(t-t_0)-\Phi_2(t)=\phi(t-t_1),$$

are again identical, except for the same time lag of $t_2-t_1$.

Figure 6:
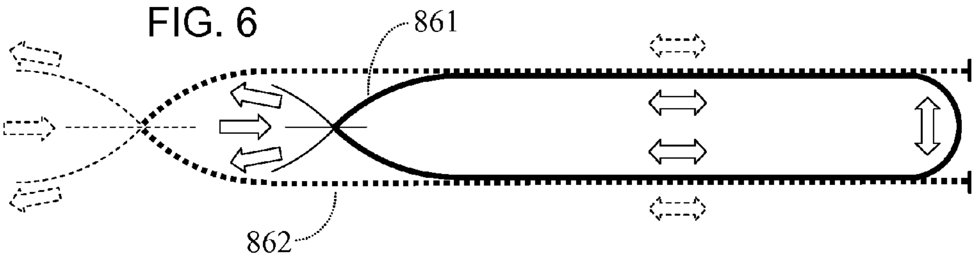
FIG. 6 is a diagram showing an exemplary hybrid structure comprising a Sagnac interferometer and a Michelson interferometer.

FIG. 6, shows another non-limiting embodiment of the present invention. This structure combines a Sagnac-type (loop) interferometer (861) with a Michelson-type (fork) interferometer (862). Because in this structure the returning signals co-propagate along the same physical paths, a means must be provided to separate the signal paths of the different interferometers, before the signal paths can be combined pair-wise for relative phase measurement (as in the illustrated structure) or, alternatively, after they are combined but before the resulting signals are sampled for phase measurement.

One embodiment is based on wavelength-division multiplexing (WDM), wherein the signals in the two interferometers are of different wavelength (typically originating from two distinct sources). WDM couplers can then be used to first combine and then separate, then combine and separate again, the signals of different wavelength whose signal paths partially overlap.

The phase variables are inversely proportional to the signal wavelength and may also be affected by dispersion. The latter effect can be made negligible by using low-dispersion signal propagation media and/or closely spaced wavelengths, or can be accounted for based on the prior knowledge of the dispersion relation. Typically, the dispersion is small enough to be safely ignored. The inverse wavelength proportionality effect can be corrected by converting phase variables of signals at different wavelengths to effective phase variables corresponding to a common reference wavelength, e.g., $\lambda_0$, by means of multiplication factors $\lambda/\lambda_0$, where $\lambda$ is actual signal wavelength. In the subsequent disclosure it is assumed that such conversion has been performed everywhere different signal wavelengths are used in the same embodiment.

Other means of separating the signal paths may involve time-domain multiplexing and/or strategic placing of isolators and/or circulators within the structure. Depending on the structure, more than two interferometers can share the same at least one waveguide using counter-propagation and another means of signal multiplexing such as WDM.

The phase responses for the Sagnac and Michelson interferometers have already been given. Here, again, respectively, $$\Phi_1(t)=\phi(t-t_1)-\phi(t-t_2-t_0)$$

$$\Phi_2(t)=\phi(t-t_1)+\phi(t-t_2-t_0)$$

The composite signals $$\Phi'_1(t)\equiv[\Phi_2(t)-\Phi_1(t)]/2=\phi(t-t_2-t_0)$$

$$\Phi'_2(t)\equiv[\Phi_2(t)+\Phi_1(t)]/2=\phi(t-t_1)$$

have a time lag of $t_0+t_2-t_1=2t_2$.

It is notable that for this, as well as for the previous two configurations discussed, the composite signals each yield exactly the relative phase induced by the disturbance (up to a constant) sampled with a time offset. This fact is particularly remarkable for the present configuration since neither Sagnac nor Michelson (unlike Mack-Zehnder) interferometers can be used individually to measure this phase.

The final two example structures pair up Sagnac-type interferometers (FIG. 7) and Michelson-type interferometers (FIG. 8), respectively. Both cases require means or techniques for separating the signal paths that belong to the different interferometers. WDM, including dual signal sources and wavelength-selective couplers, and wavelength-corrected phase signals, or other ways to maintain separately considered signal paths, can again be used for this purpose.

Figure 7:
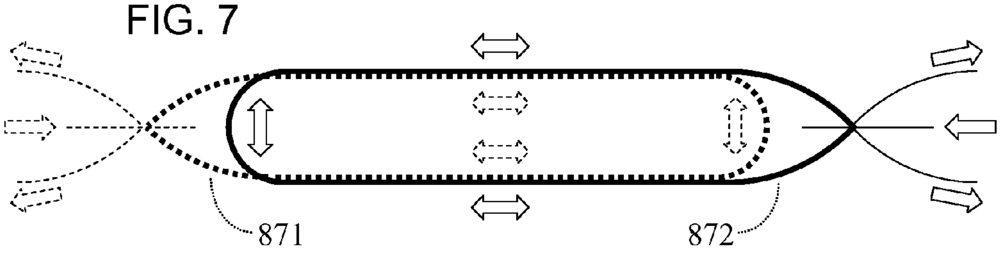
FIG. 7 is a diagram showing another example, with two Sagnac interferometers.
Figure 8:
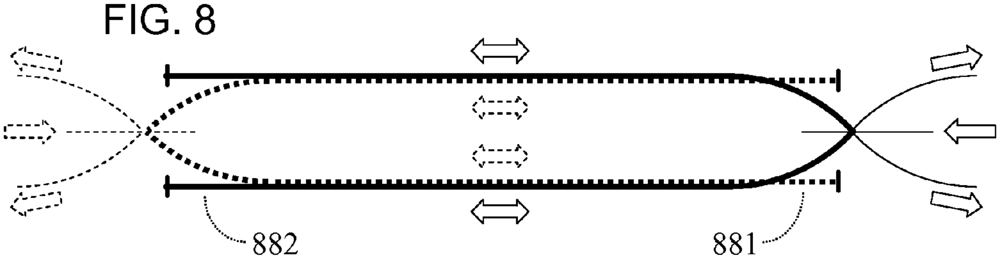
FIG. 8 is a diagram of another example, comprising two Michelson interferometers.
Figure 10A:
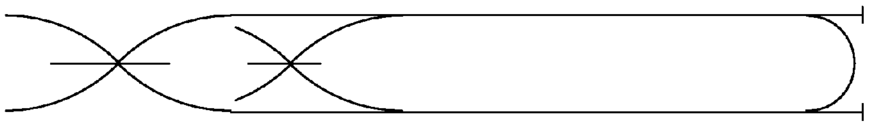
FIG. 10 is an illustration of an exemplary implementation of the structure of FIG. 6, using wavelength-division multiplexing.
Figure 10B:
Figure 10C:
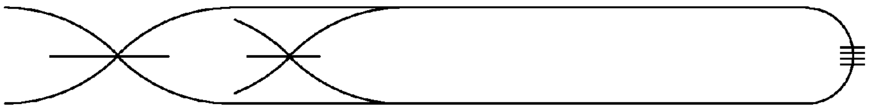
Figure 10D:
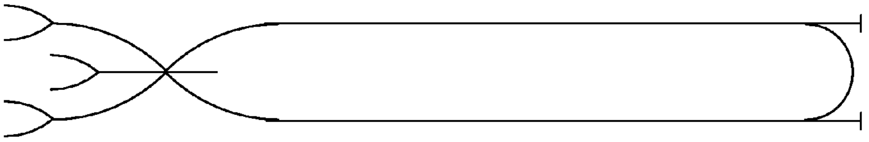
Figure 10E:
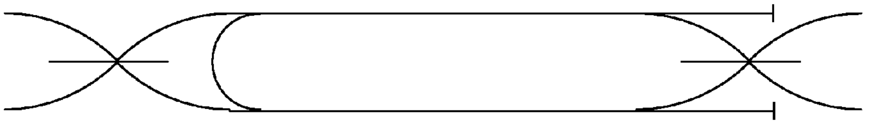

Generally, in order to yield linearly independent phase relationships, interferometers of the same type must be oppositely oriented with respect to the detection zone, e.g., have input ends on the opposite ends of the overlapping portions of waveguides. Such oppositely superimposed interferometers are illustrated in FIGS. 1, 7, and 8 for the basic interferometer types. Interferometers of different types, on the other hand, can generally be combined with either relative orientation, as illustrated for example by FIGS. 10*a* and 10*e*.

For the dual Sagnac structure (FIG. 7):

$$\Phi_1(t)=\phi(t-t_1)-\phi(t-t_2-t_0)$$

$$\Phi_2(t)=\phi(t-t_2)-\phi(t-t_1-t_0)$$

$$\Phi'_1(t)\equiv\Phi_1(t)+\Phi_2(t-t_0)=\phi(t-t_1)-\phi(t-t_1-2t_0)$$

$$\Phi'_2(t)\equiv\Phi_1(t-t_0)+\Phi_2(t)=\phi(t-t_2)-\phi(t-t_2-2t_0)$$

Similarly, for the dual Michelson structure (FIG. 8):

$$\Phi_1(t)=\phi(t-t_1)+\phi(t-t_2-t_0)$$

$$\Phi_2(t)=\phi(t-t_2)+\phi(t-t_1-t_0)$$

$$\Phi'_1(t)\equiv\Phi_1(t)-\Phi_2(t-t_0)=\phi(t-t_1)-\phi(t-t_1-2t_0)$$

$$\Phi'_2(t)\equiv\Phi_1(t-t_0)-\Phi_2(t)=\phi(t-t_2)-\phi(t-t_2-2t_0)$$

Both cases allow the same expressions for $\Phi'_1(t)$ and $\Phi'_2(t)$ to be derived from the measured responses. The composite signals are no longer the relative phase induced by the disturbance, but rather the change in the relative phase over the signal roundtrip time ($2t_0$). The time lag between $\Phi'_1(t)$ and $\Phi'_2(t)$ is $t_1-t_2$ for both structures.

Figure 9A:
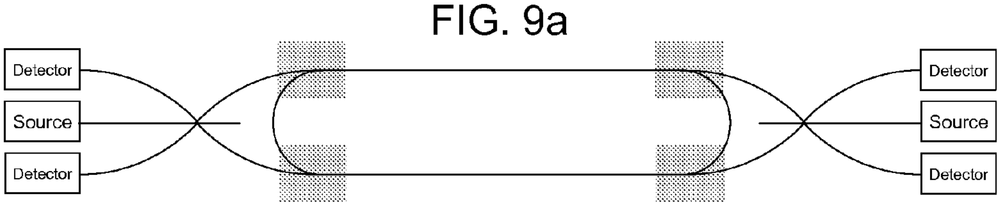
FIG. 9 is an illustration of an exemplary implementation of the structure of FIG. 7, using wavelength-division multiplexing for distinguishing among signal paths.
Figure 9B:
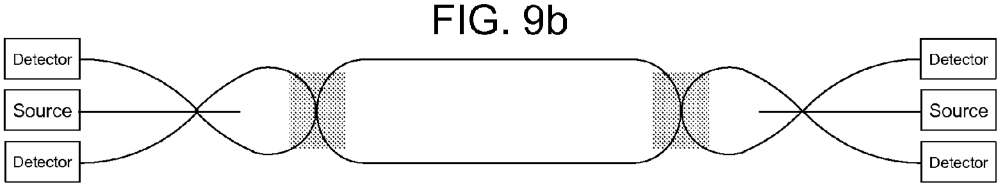

FIG. 9 shows two possible embodiments of the dual Sagnac structure introduced schematically in FIG. 7. One is based on four 3-port WDM couplers, such as the ones utilizing designer-coated selective reflectors, commonly used in telecom equipment. The other one makes use of two 4-port WDM couplers, such as specially designed 2-fiber fusion couplers. Phase-responsive receivers comprising 3×3 couplers and paired signal detectors are shown for illustrative purposes. Other types of phase-responsive receivers can be used in their places.

Figure 4:
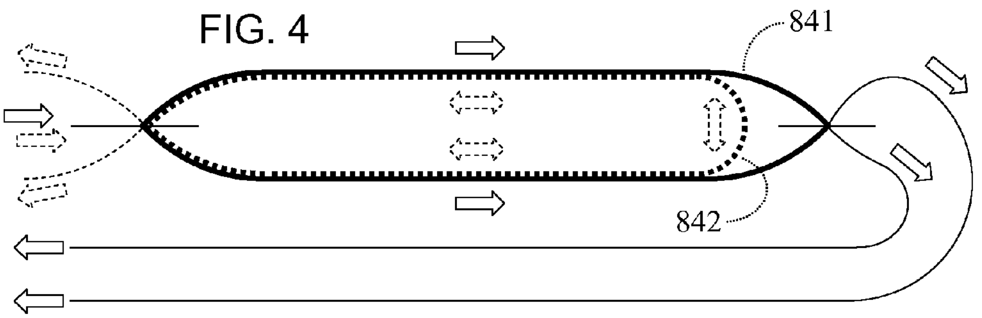
FIG. 4 is a diagram showing the structure of FIG. 3 with outputs of an interferometer combiner returning to the origination point for detection.

Because $\Phi'_1(t)$ and $\Phi'_2(t)$ combine both immediate and retarded versions of the direct response signals $\Phi_1(t)$ and $\Phi_2(t)$, the physical implementation of the retardation, analogous to the one shown in FIG. 4 for another structure, would require 4 phase-sensitive detectors, which is unlikely to be considered practical. The other option is to compute the retarded signals in the signal processing domain using the known value of $t_0$.

The embodiments treated here as non-limiting examples, as well as their derivative structures and other structures apparent to those skilled in the art, all have unique characteristics and may be considered advantageous due to such characteristics when compared to other such structures. For example, the structures discussed here that utilize a Mach-Zehnder-type interferometer as at least one of the interferometers do not require WDM or other such means for separating the signal paths belonging to different interferometers (the signals are separated by means of counter-propagation). These structures may therefore be implemented with a single signal source, with the emitted signal split between the two interferometers.

A special advantage of the Sagnac-type structures and other zero-path-difference interferometer structures stems from the fact that the lengths of their signal paths are precisely equal as they share the same physical path, e.g., the Sagnac loop. By contrast, the signal paths in other interferometer types are physically separated and their lengths need to be matched to within the coherence length of the source. In fact, a broadband source can be used with a Sagnac interferometer, while other structures generally require a narrow-band source such as a distributed-feedback (DFB) laser, given the practical limitations of the length-matching precision.

Finally, Michelson-type structures have a unique advantage when implemented using Faraday mirrors to terminate the far ends of each waveguide. In this arrangement, the visibility of the interference fringes is always maximum, affected neither by the polarization state of the input signal nor by the polarization transforming properties of the interferometer medium. By contrast, other structures may require at least limited means of either avoiding or treating the situation in which the polarization states of the signals at the signal combiner become substantially orthogonal. Such means may include polarization control means to advantageously adjust the polarization state of the input signal or polarization detection means to measure the relative phase of the combined signals in said special case when their polarization states are substantially orthogonal.

In the above context, a Sagnac structure can also be used in conjunction with a source of un-polarized or depolarized broad-band signal to mitigate the polarization issue. Generally, a depolarizer also needs to be inserted inside a Sagnac loop to mitigate its birefringent properties. The main practical drawback of the Sagnac-type structures is the overall magnitude of its phase response, which is typically smaller or much smaller than that of the other structure types, and correspondingly reduced signal-to-noise ratio, particularly for disturbances occurring close to the center of the Sagnac loop.

Figure 11:
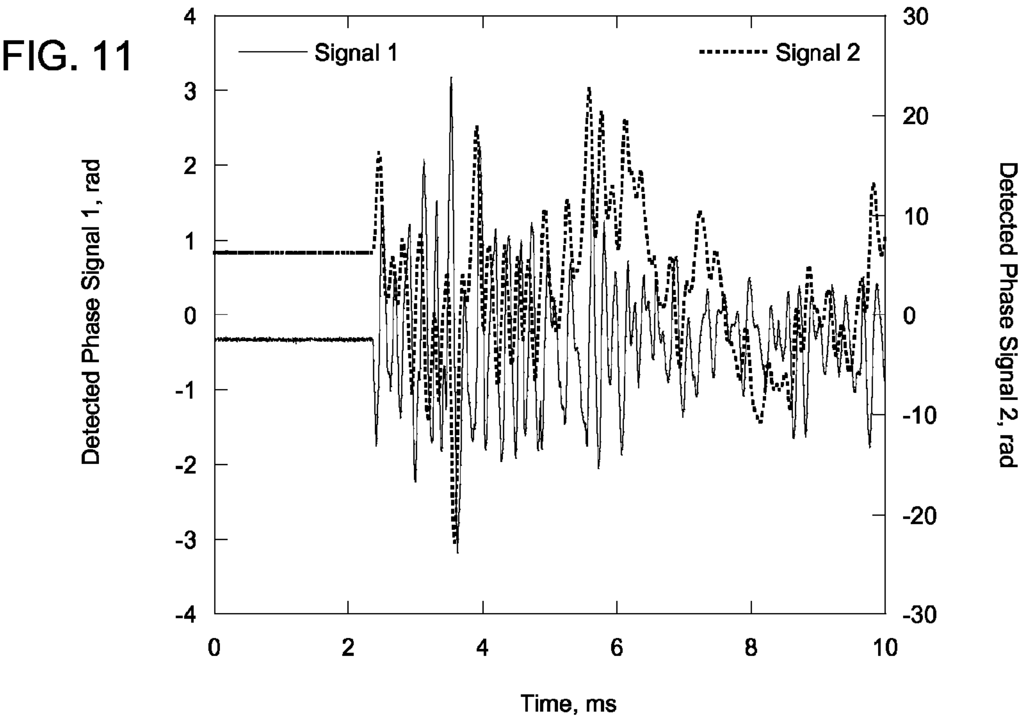
FIG. 11 is a time plot of the detected phase responses of the two interferometers of the structure in FIG. 6 during a disturbance, it being noted that the signals have do not have corresponding waveshapes over time.
Figure 12:
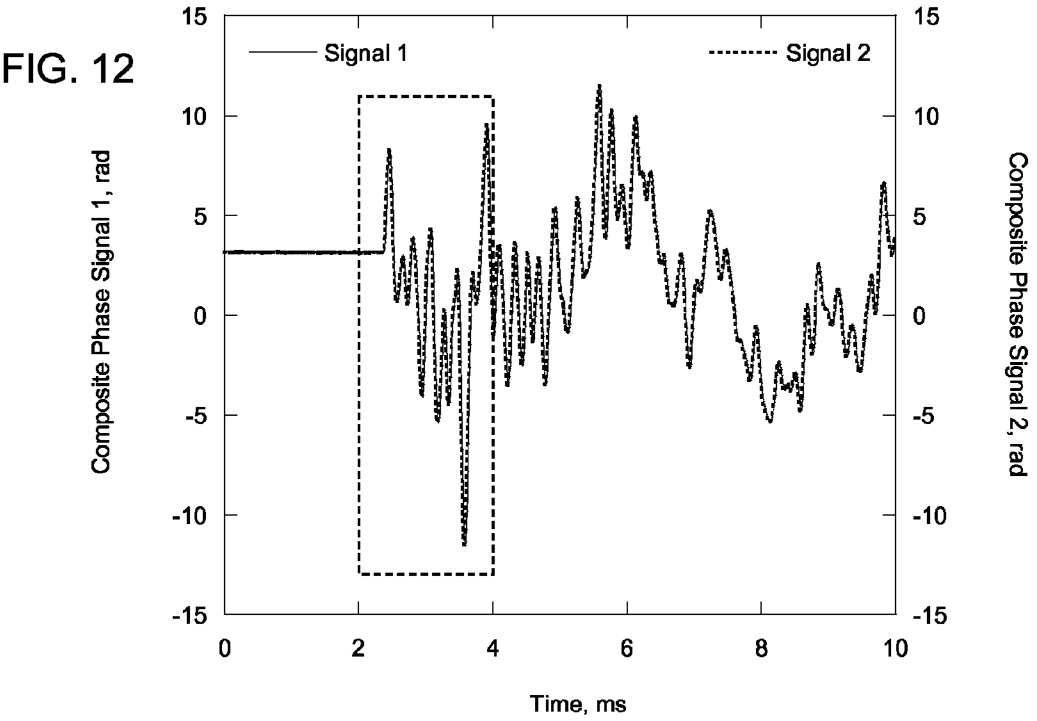
FIG. 12 is a time plot showing two processed composite signals derived from the detected signals shown in FIG. 11, it being noted that these composite signals have corresponding waveshapes over time.
Figure 13:
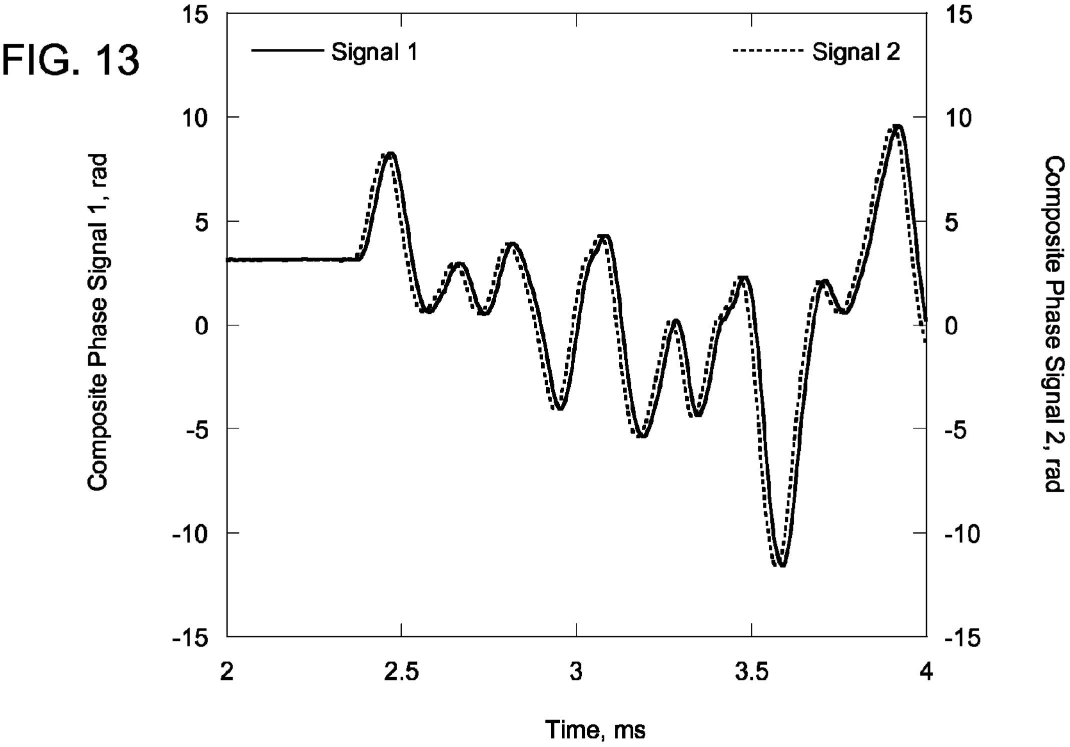
FIG. 13 is a time plot of a portion of the plot in FIG. 12 with an expanded time scale, this plot showing a time lag between the two substantially identical composite phase signals, said time lag representing the location of a disturbance that produced the variations shown.

The structure in FIG. 6, comprising a Sagnac interferometer as Interferometer (861) and a Michelson interferometer as the other Interferometer (862), utilizes the fewest number of physical paths in the dead-end configuration and is therefore an attractive option from that standpoint. FIG. 10 shows several possible embodiments of this structure based on WDM. FIGS. 11 through 13 further illustrate the invention concept by showing experimental data for this hybrid structure. The disturbance that produced the data was created at a distance $L_2$=1.6 km from the far end of the structure, containing the midpoint of the Sagnac loop and the reflection points of the Michelson interferometer.

FIG. 11 shows the directly measured phase responses $\Phi_1(t)$ and $\Phi_2(t)$ of the two interferometers. It is clear that the measured signals differ significantly in shape and magnitude. FIG. 12 shows the composite signals $\Phi'_1(t)$ and $\Phi'_2(t)$ computed as half of the sum and half of the difference of the measured phase responses, with the constant phase offset removed. These signals are substantially identical in shape, as expected, except for the time lag. FIG. 13 gives a closer view of the same data along the time scale, in which the time lag is readily visible.

The measurement of the time lag yields the value of approximately 16 μs, very close to the expected value given by $2L_2/c$.

An alternative means of determining the location of a disturbance is based on comparison of instantaneous or time-averaged magnitudes of composite signals derived from the phase responses of the sensing structure. This approach applies to all example embodiments introduced above as well as to other structures apparent to those skilled in the art. This approach is described here using the structure in FIG. 3 as an illustrative example. The structure combines a Mach-Zehnder interferometer (831) with a Sagnac interferometer (832).

The measured phase relationships of the two interferometers are, as disclosed above, $$\Phi_1(t)=\phi(t-t_2)$$

$$\Phi_2(t)=\phi(t-t_1)-\phi(t-t_2-t_0)$$

Using the phase-responsive receiver on interferometer (831) allows to directly measure the relative phase change induced by the disturbance, $\phi(t-t_2)$. The magnitude of the latter phase response, produced by interferometer (832), depends critically on the disturbance position as measured by $t_2$. In particular if the disturbance occurs at the midpoint of the Sagnac loop, $t_2$ is zero and interferometer (832) produces no response.

Composite signals can be constructed as $$\Phi'_1(t)\equiv\Phi_1(t)-\Phi_1(t-\Delta t)$$

$$\Phi'_2(t)\equiv\Phi_2(t)$$

Here $\Delta t$ is a fixed time increment that is small compared to the signal propagation time $t_0$. For practical purposes, $\Delta t$ can be, for example, a signal sampling interval of a signal digitizer.

The response of interferometer (832), which in this case is also the second composite signal $\Phi'_2(t)$, can be approximated as $\phi'(t-_{t0})\cdot 2t_2$, where $\phi'(t)$ denotes a time derivative of the disturbance-induced phase. This composite signal depends on the location of the disturbance through $t_2$, but also depends on the time-varying magnitude and frequency of the disturbance. On the other hand, the differential of the interferometer (831) response, which is the first composite signal $\Phi'_1(t)$, can be approximated as $\phi'(t-t_2)\cdot\Delta t$. The approximations made above assume that $\phi'(t)$ varies slowly on the scale of the signal propagation time $t_0$, which condition is generally satisfied. Within the same approximation, the above composite signals are the same except for the overall scale factor of $2t_2/\Delta t=2L_2/(c\Delta t)$. Therefore, the location $L_2$ of the disturbance can be readily obtained from the ratio $\Phi'_2(t)/\Phi'_1(t)$ of the composite signals.

Figure 14:
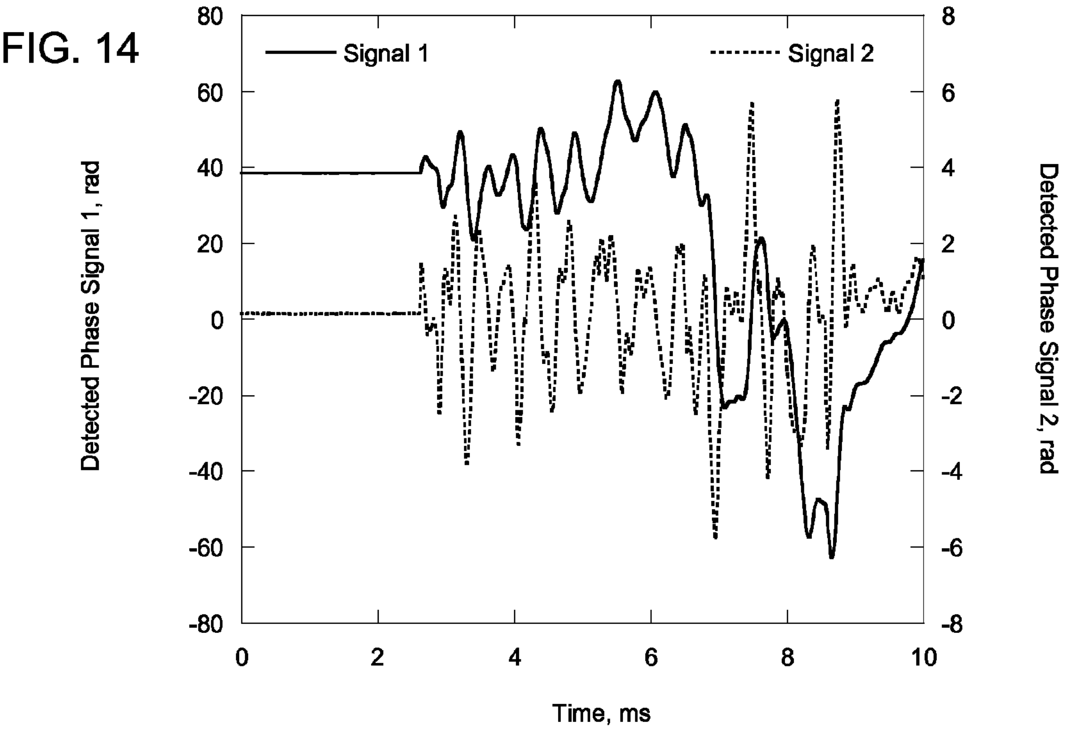
FIG. 14 is a time plot of the detected phase responses of the two interferometers of the structure in FIG. 3 during a disturbance, which phase responses appear to be uncorrelated.
Figure 15:
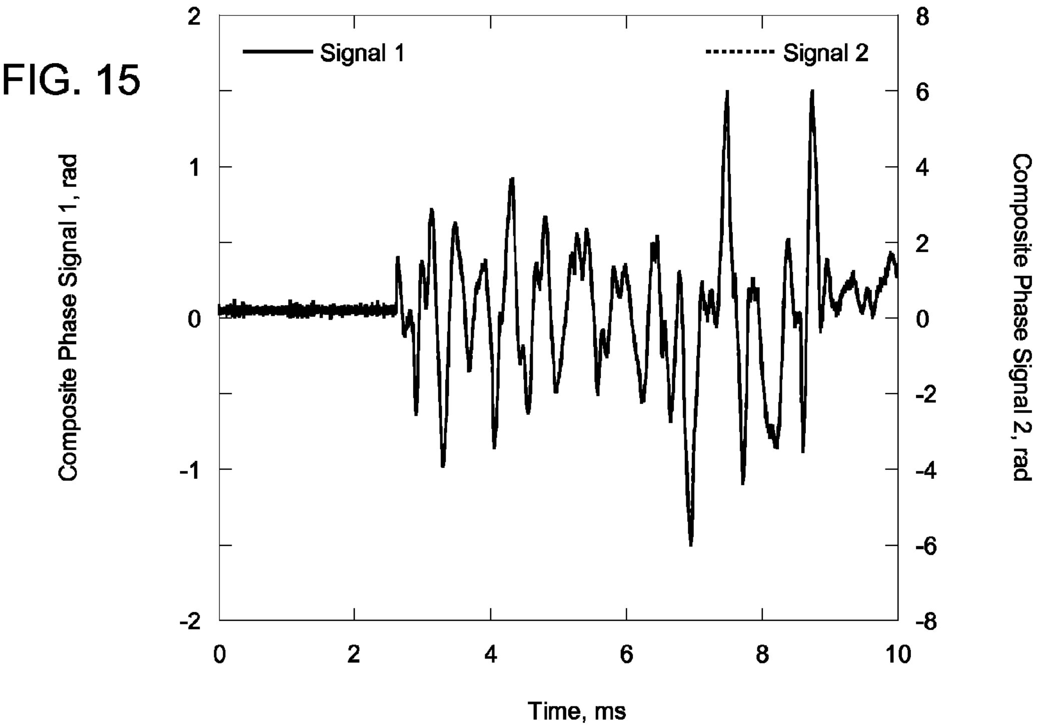
FIG. 15 is a time plot of processed versions of the signals shown in FIG. 14. The ratio of the signal magnitudes yields the location of the disturbance.

A sample of phase responses of the above configuration is shown in FIG. 14. The disturbance was created at the point $L_1$=0, $L_2$=1.6 km. "Signal 1" in the plot labels corresponds to Mach-Zehnder interferometer (831), "Signal 2" corresponds to Sagnac interferometer (832). FIG. 15 shows the data from FIG. 14 with the interferometer (831) signal replaced by its differential signal with time base $\Delta t$=4 μs. The graph shows an overlap of the two data sets for the scaling factor of 4.0, which yields $t_2$=8 μs and disturbance position $L_2$=1.6 km, consistent with the experimental setup.

Interferometer (831) and interferometer (832) composite signals also yield approximations of phase derivatives evaluated at slightly different times which may produce a measurable time lag between them. The time lag between the composite signals, determined, for example, from the correlation of the two data sets, may therefore provide another estimate of the position of the disturbance.

Rather than using a point-wise approach, one can compute a ratio of the average powers of the two composite signals to provide another estimate of the intrusion location. Using time-averaged measures of signal magnitudes does not require the phase responses or their composite signals to be of substantially the same shape over time.

Alternatively, the ratio of the average power of the interferometer (831) signal and the average power of the frequency-weighted interferometer (832) signal can be used for the same purpose.

Figure 16:
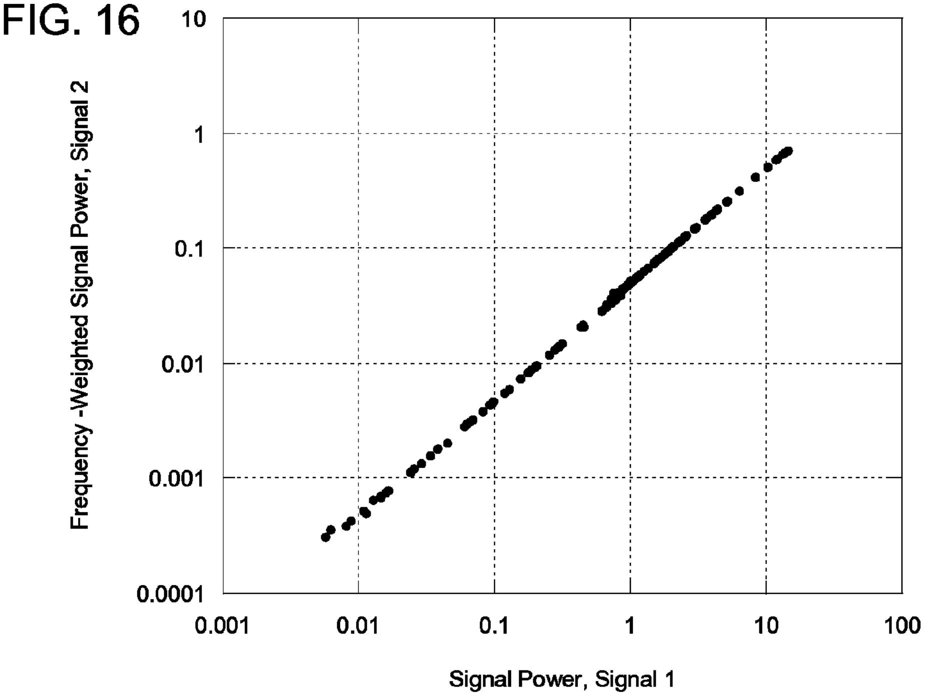
FIG. 16 is an X-Y plot showing the mutual dependence of the average signal powers for a sequence of disturbances of different strength at the same location, plotted as points.

The latter approach is illustrated in FIG. 16 for a set of 150 segments of phase response signals detected during a disturbance, the duration of each segment about 65 ms. The slope of the straight line formed by the individual data points yields the above ratio that can be used to derive the location of the disturbance. As clearly evident from the data, the ratio maintains a universal value even as the instantaneous magnitude of the disturbance varies by over 3 orders of magnitude.

The above prescription can be applied to other structures described here, as well as other similar or derivative structures. Other illustrative examples can be given for the dual Sagnac structure in FIG. 7, with composite signals $\Phi'_1(t)\equiv\Phi_1(t)$ and $\Phi'_2(t)\equiv\Phi_2(t)$, and the dual Mach-Zehnder structure in FIG. 1, with composite signals $\Phi'_1(t)\equiv\Phi_2(t)-\Phi_1(t-t_0)$ and $\Phi'_2(t)\equiv\Phi_1(t)-\Phi_2(t-t_0)$. The ratio of the composite signals in both cases yields an estimate for $t_1/t_2$ or, identically, for $L_1/L_2$, which uniquely defines the location of the disturbance.

The invention has been disclosed in connection with several exemplary embodiments that should be considered illustrative rather than limiting. Reference should be made to the appended claims rather than the discussion of examples, to determine the scope of exclusive rights claimed.

What is claimed is:

1. A method for locating physical disturbances occurring in a detection zone, comprising:

coupling at least one signal source to two interferometers, each said interferometer defining two signal paths of substantially equal lengths, wherein said coupling comprises coupling a Mach-Zehnder interferometer with a Sagnac interferometer, wherein the input ends of the interferometers define one end of a structure and wherein the output end of the Mach-Zehnder interferometer and a center point of a Sagnac interferometer loop define an other end of the structure;

arranging the signal paths such that at least parts of signal paths of said two interferometers overlap;

causing the signals traveling along the parts of the signal paths that overlap to traverse the detection zone at least once;

wherein a disturbance in the detection zone instills time variations in phase differences between the signals traveling along the signal paths of the two interferometers, at a point where the disturbance occurs;

coupling at least one signal receiver to the output ends of the interferometers and configuring the signal receiver to measure said time variations in the phase differences between the signals traveling along the signal paths of said two interferometers;

processing outputs of the signal receiver to derive two composite variables from the time variations in the phase differences, wherein a relationship between said composite variables varies with a location of the point of the disturbance, wherein the composite variables are derived in the form:

$$\Phi'_1(t)=\Phi_1(t)$$

$$\Phi'_2(t)=\Phi_1(t-t_0)+\Phi_2(t)$$

where $\Phi_1$(t) and $\Phi_2$(t) are said variations over time in phase differences for the Mach-Zehnder interferometer and the Sagnac interferometer, respectively, and $t_0$ is a one-way signal propagation time of the structure;

wherein the composite variables have substantially identical waveshapes at a time lag of $t_2$-$t_1$, where $t_1$ and $t_2$ are signal propagation times from the point of disturbance to respective said ends of the structure; and determining the point in the detection zone at which the disturbance occurred, from the relationship between the composite variables, including said time lag.

2. A method for locating physical disturbances occurring in a detection zone, comprising:

coupling at least one signal source to two interferometers, each said interferometer defining two signal paths of substantially equal lengths, wherein said coupling comprises coupling a Mach-Zehnder interferometer with a Michelson interferometer, wherein the input ends of the interferometers define one end of a structure and wherein the output end of the Mach-Zehnder interferometer and at least one reflection point of the Michelson interferometer define an other end of the structure;

arranging the signal paths such that at least parts of signal paths of said two interferometers overlap;

causing the signals traveling along the parts of the signal paths that overlap to traverse the detection zone at least once;

wherein a disturbance in the detection zone instills time variations in phase differences between the signals traveling along the signal paths of the two interferometers, at a point where the disturbance occurs;

coupling at least one signal receiver to the output ends of the interferometers and configuring the signal receiver to measure said time variations in the phase differences between the signals traveling along the signal paths of said two interferometers;

processing outputs of the signal receiver to derive two composite variables from the time variations in the phase differences, wherein a relationship between said composite variables varies with a location of the point of the disturbance, wherein the composite variables are derived in the form:

$$\Phi'_1(t)=\Phi_1(t)$$

$$\Phi'_2(t)=\Phi_1(t-t_0)-\Phi_2(t)$$

where $\Phi_1$(t) and $\Phi_2$(t) are said time variations in phase differences for the Mach-Zehnder interferometer and the Michelson interferometer, respectively, and $t_0$ is a one-way signal propagation time of the structure; wherein the composite variables have substantially identical waveshapes at a time lag of $t_2$-$t_1$, where $t_1$ and $t_2$ are signal propagation times from the point of disturbance to respective said ends of the structure; and determining the point in the detection zone at which the disturbance occurred, from the relationship between the composite variables, including said time lag.

3. A method for locating physical disturbances occurring in a detection zone, comprising:

coupling at least one signal source to two interferometers, each said interferometer defining two signal paths of substantially equal lengths, wherein said coupling comprises coupling a Sagnac interferometer with a Michelson interferometer by means of signal multiplexing, wherein the input ends of the interferometers define one end of a structure and wherein a center point of a Sagnac interferometer loop and at least one reflection point of the Michelson interferometer define an other end of the structure;

arranging the signal paths such that at least parts of signal paths of said two interferometers overlap;

causing the signals traveling along the parts of the signal paths that overlap to traverse the detection zone at least once;

wherein a disturbance in the detection zone instills time variations in phase differences between the signals traveling along the signal paths of the two interferometers, at a point where the disturbance occurs;

coupling at least one signal receiver to the output ends of the interferometers and configuring the signal receiver to measure said time variations in the phase differences between the signals traveling along the signal paths of said two interferometers;

processing outputs of the signal receiver to derive two composite variables from the time variations in the phase differences, wherein a relationship between said composite variables varies with a location of the point of the disturbance, wherein the composite variables are derived in the form:

$$\Phi'_1(t)=[\Phi_2(t)-\Phi_1(t)]/2$$

$$\Phi'_2(t)=[\Phi_2(t)+\Phi_1(t)]/2$$

where $\Phi_1$(t) and $\Phi_2$(t) are said time variations in phase differences for the Sagnac interferometer and the Michelson interferometer, respectively;

wherein the composite variables have substantially identical waveshapes at a time lag of $2t_2$, where $t_2$ is a signal propagation time from the point of disturbance to an end of the structure opposite from the input ends of the interferometers; and, determining the point in the detection zone at which the disturbance occurred, from the relationship between the composite variables, including said time lag.

4. A method for locating physical disturbances occurring in a detection zone, comprising:

coupling at least one signal source to two interferometers, each said interferometer defining two signal paths of substantially equal lengths, wherein said coupling comprises coupling two Sagnac interferometers by signal multiplexing, wherein the input ends of the interferometers define opposite ends of a structure and wherein the input end of each one of said two Sagnac interferometers is at a same end of the structure as a center point of a Sagnac loop of an other one of said two Sagnac interferometers;

arranging the signal paths such that at least parts of signal paths of said two interferometers overlap;

causing the signals traveling along the parts of the signal paths that overlap to traverse the detection zone at least once;

wherein a disturbance in the detection zone instills time variations in phase differences between the signals traveling along the signal paths of the two interferometers, at a point where the disturbance occurs;

coupling at least one signal receiver to the output ends of the interferometers and configuring the signal receiver to measure said time variations in the phase differences between the signals traveling along the signal paths of said two interferometers;

processing outputs of the signal receiver to derive two composite variables from the time variations in the phase differences, wherein a relationship between said composite variables varies with a location of the point of the disturbance, wherein the composite variables are derived in the form:

$$\Phi'_1(t)=\Phi_1(t)+\Phi_2(t-t_0)$$

$$\Phi'_2(t)=\Phi_1(t-t_0)+\Phi_2(t)$$

where $\Phi_1(t)$ and $\Phi_2(t)$ are said time variations in phase differences for the said Sagnac interferometers, and $t_0$ is a one-way signal propagation time of the structure;

wherein the composite variables have substantially identical waveshapes at a time lag of $t_1-t_2$, where $t_1$ and $t_2$ are signal propagation times from the point of disturbance to respective said ends of the structure; and determining the point in the detection zone at which the disturbance occurred, from the relationship between the composite variables, including said time lag.

5. A method for locating physical disturbances occurring in a detection zone, comprising:

coupling at least one signal source to two interferometers, each said interferometer defining two signal paths of substantially equal lengths, wherein said coupling comprises coupling two Michelson interferometers by signal multiplexing, wherein the input ends of the interferometers define opposite ends of a structure and wherein the input end of each one of said two Michelson interferometers is at a same end of the structure as at least one reflection point of an other one of said two Michelson interferometers;

arranging the signal paths such that at least parts of signal paths of said two interferometers overlap;

causing the signals traveling along the parts of the signal paths that overlap to traverse the detection zone at least once;

wherein a disturbance in the detection zone instills time variations in phase differences between the signals traveling along the signal paths of the two interferometers, at a point where the disturbance occurs;

coupling at least one signal receiver to the output ends of the interferometers and configuring the signal receiver to measure said time variations in the phase differences between the signals traveling along the signal paths of said two interferometers;

processing outputs of the signal receiver to derive two composite variables from the time variations in the phase differences, wherein a relationship between said composite variables varies with a location of the point of the disturbance, wherein the composite variables are derived in the form:

$$\Phi'_1(t)=\Phi_1(t)-\Phi_2(t-t_0)$$

$$\Phi'_2(t)=\Phi_1(t-t_0)-\Phi_2(t)$$

where $\Phi_1(t)$ and $\Phi_2(t)$ are said time variations in phase differences for said Michelson interferometers, and $t_0$ is a one-way signal propagation time of the structure;

wherein the composite variables have substantially identical waveshapes at a time lag of $t_1-t_2$, where $t_1$ and $t_2$ are signal propagation times from the point of disturbance to respective said ends of the structure; and, determining the point in the detection zone at which the disturbance occurred, from the relationship between the composite variables, including said time lag.

* * * * *